Figure 1B:
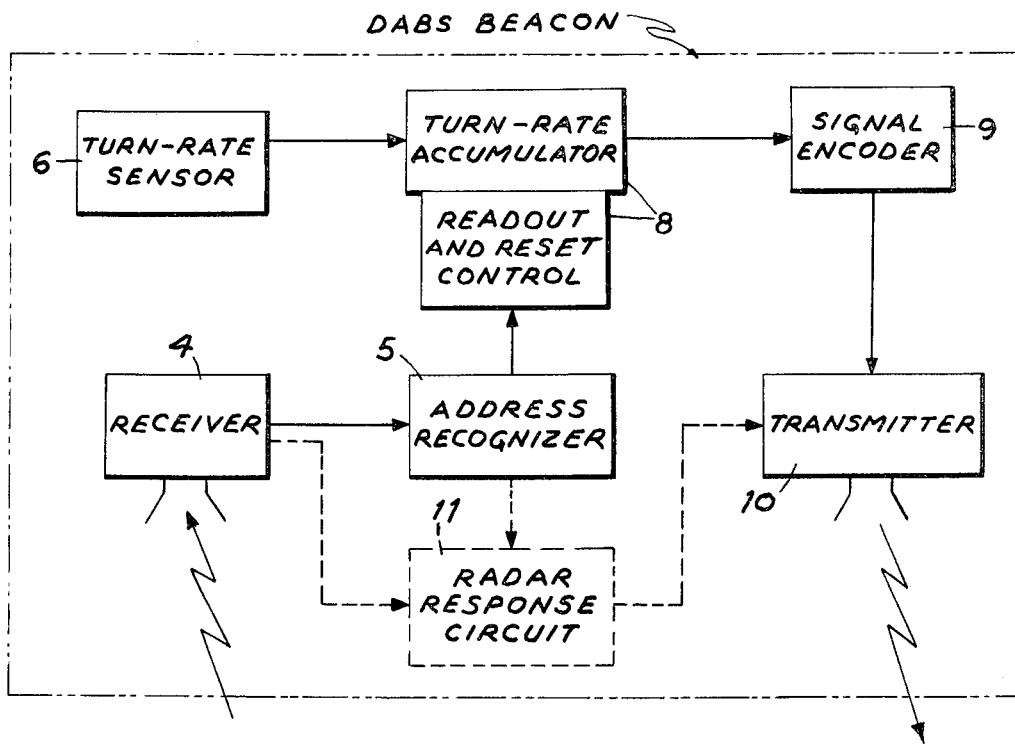

United States Patent [19]

Fielding

[11] 3,775,767

[45] Nov. 27, 1973

[54] AIR-TRAFFIC REGULATING SYSTEMS
[75] Inventor: John C. Fielding, Arlington, Va.
[73] Assignee: General Research Corporation, Santa Barbara County, Calif.
[22] Filed: Jan. 17, 1972
[21] Appl. No.: 218,137

[52] U.S. Cl..... 343/6.5 R, 235/150.26, 343/112 TC
[51] Int. Cl................................................ G01s 9/56
[58] Field of Search.................. 235/150.26, 150.23; 343/5 R, 112 TC, 112 C, 112 CA, 6.5 R

[56] References Cited
UNITED STATES PATENTS

| | | | |
|---|---|---|---|
| 3,140,391 | 7/1964 | Daspit............................ | 235/150.23 |
| 3,171,121 | 2/1965 | Solga............................. | 343/112 CA |
| 3,310,806 | 3/1967 | Stansbury...................... | 343/112 CA |
| 3,495,260 | 2/1970 | Laughlin et al................ | 343/112 TC |
| 3,582,626 | 6/1971 | Stansbury ...................... | 235/150.23 |
| 3,668,403 | 6/1972 | Meilander...................... | 343/112 C |
| 3,330,944 | 7/1967 | Inderhees...................... | 235/150.23 |

Primary Examiner—Benjamin A. Borchelt
Assistant Examiner—H. A. Birmiel
Attorney—Paul R. Adams

[57] ABSTRACT

An improved position-prediction method and subsystem to permit better ground prediction of aircraft future position is disclosed. It is proposed for use in air traffic control systems which offer an IPC (intermittent positive control) service to all VER aircraft which carry the not yet standardized DABS beacon (a planned discretely-addressable variant of present radar-response beacons which is to include automatic reception and display of ground-to-air commands). Disclosure proposes that this planned new beacon should include modest cost means to report turn rate periodically and that a string of successive radar fixes be data processed with a corresponding string of such turn rate reports to derive aircraft "flight-headings" which are both accurate (due to averaging many noisy radar fixes over many seconds of time) and very current by virtue of the turn rate reports which effectively remove the long lag resulting from such averaging. The disclosure shows five different methods and means to process such data so as to derive accurate current "flight-headings" and to predict future positions based thereon.

4 Claims, 12 Drawing Figures

United States Patent [19]
Fielding
[11] 3,775,767
[45] Nov. 27, 1973
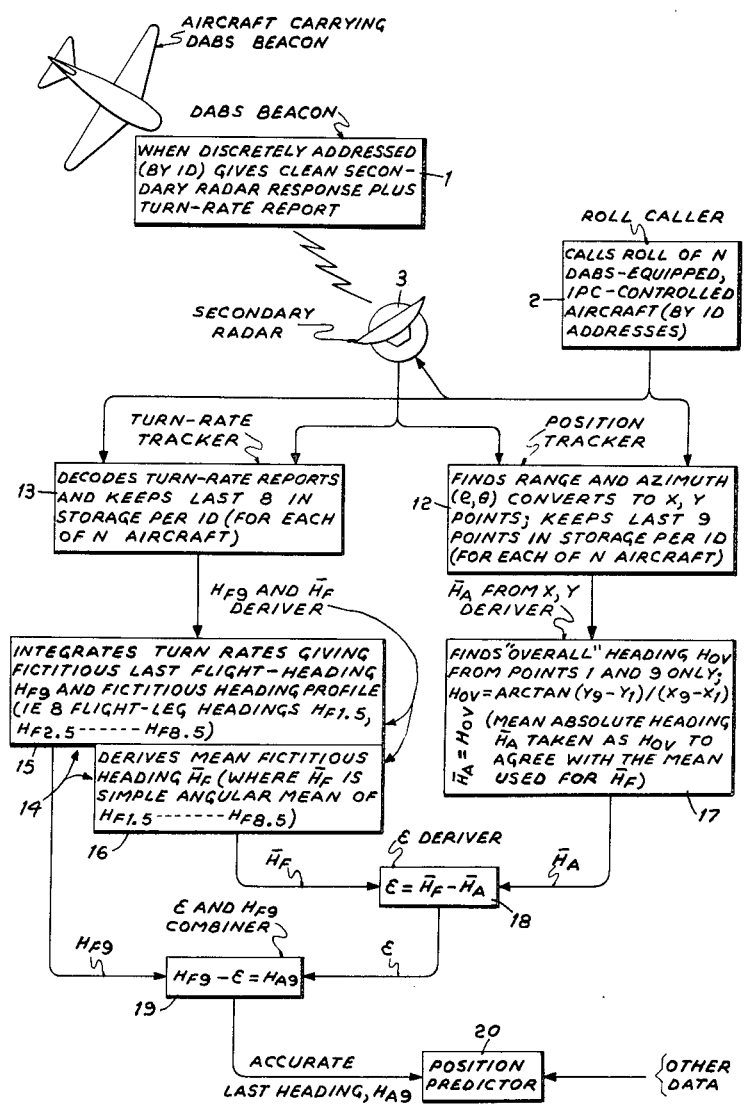

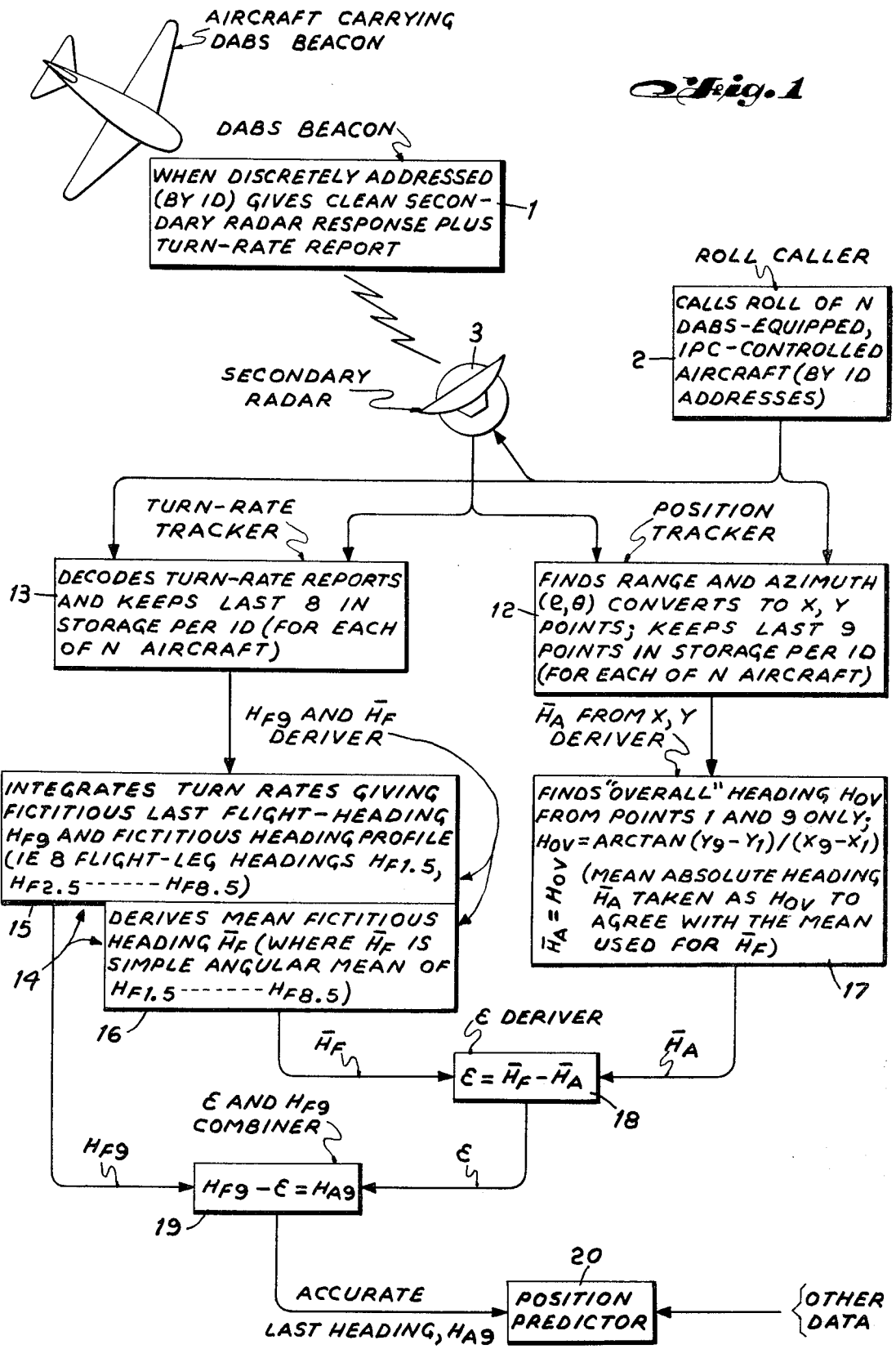

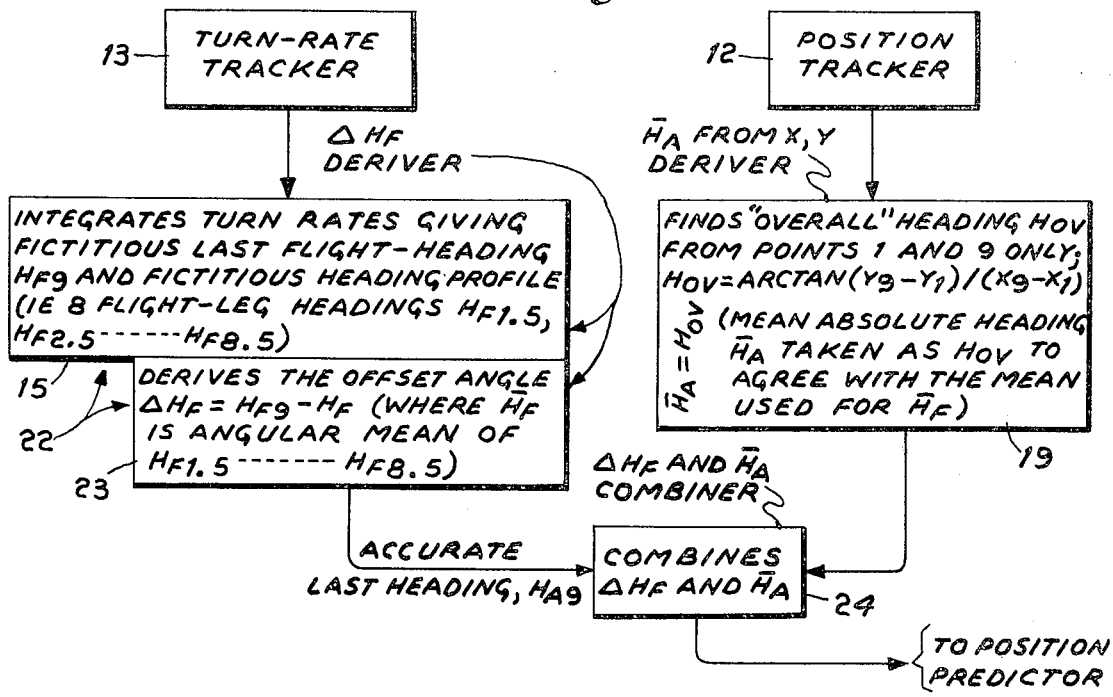
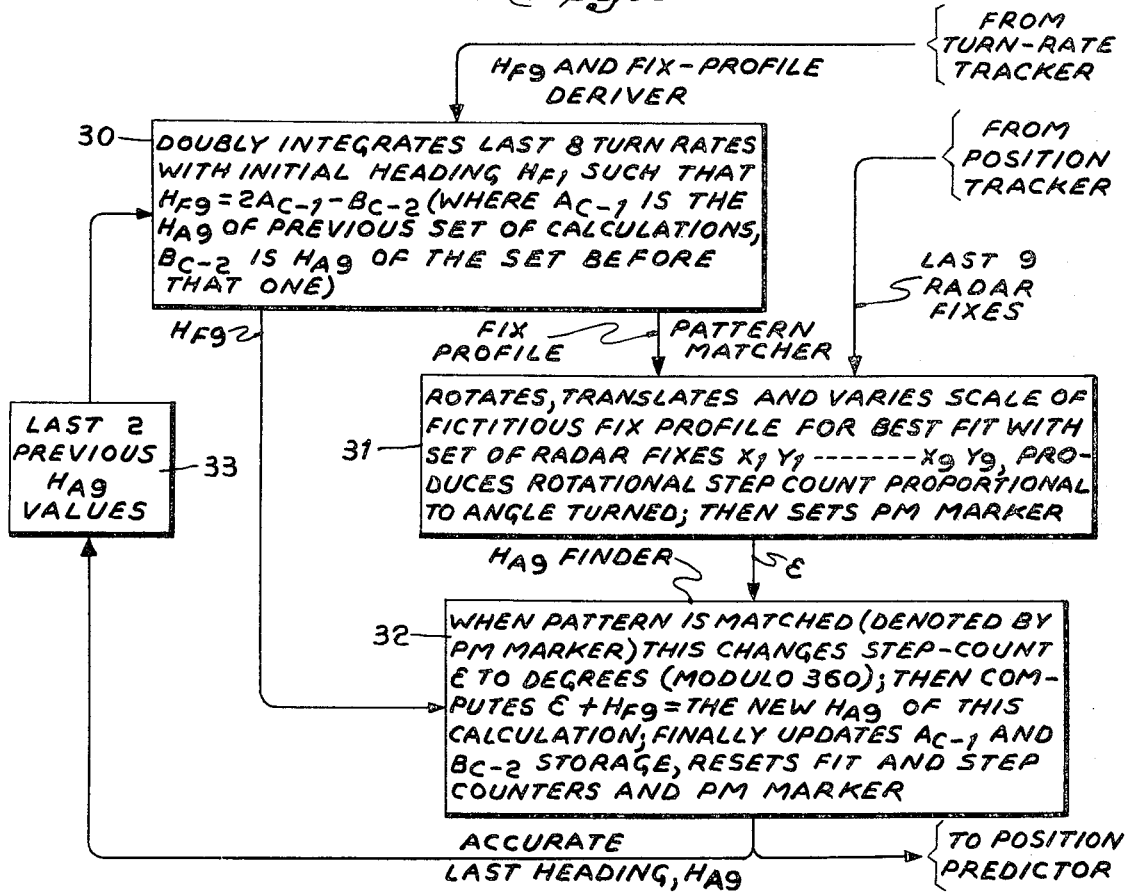

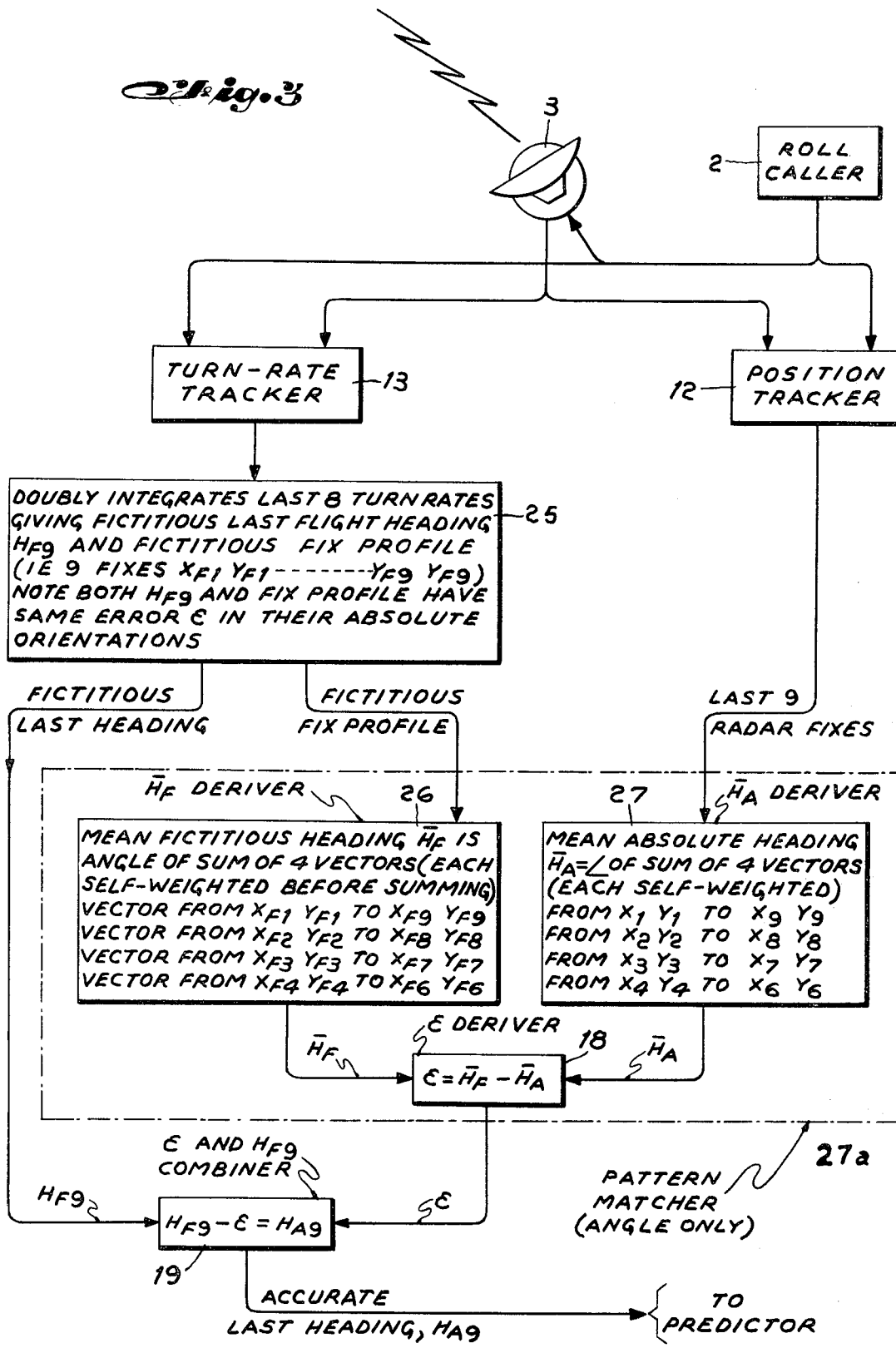

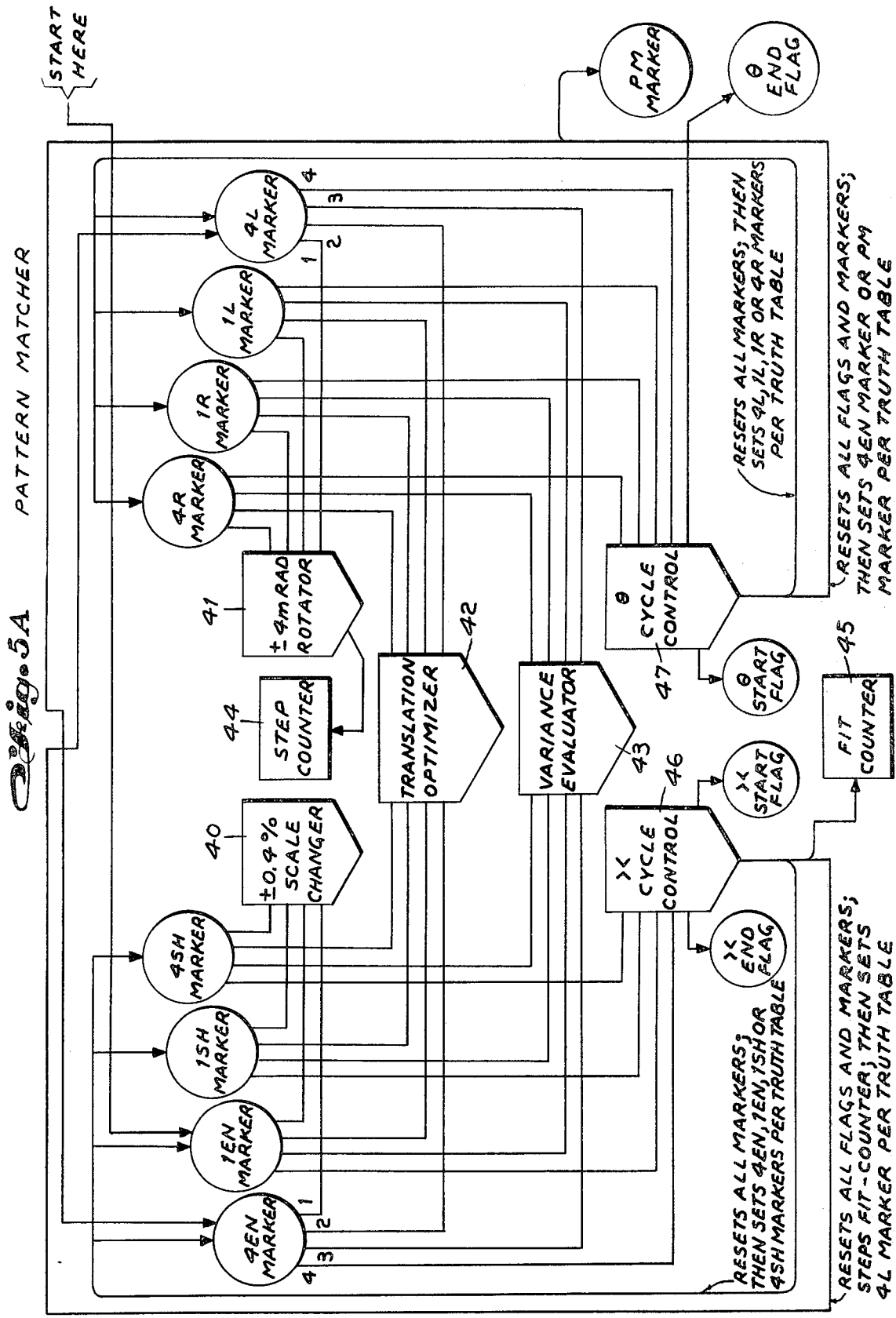
Fig. 5A PATTERN MATCHER

Fig. 5B

±0.4% SCALE CHANGER

[40] UPDATES $X_{F1}, Y_{F1}$ AS FOLLOWS:
$X_{F1} \pm (1/256)X_{F1}$ IS NEW $X_{F1}$
$Y_{F1} \pm (1/256)Y_{F1}$ IS NEW $Y_{F1}$
SIMILARLY UPDATES $X_{F2}$ AND $Y_{F2}$, $X_{F3}$ AND $Y_{F3}$, — — — —
— — — $X_{F9}$ AND $Y_{F9}$
UPPER SIGNS GIVE MAGNIFICATION

± 4m RAD ROTATOR

[41] UPDATES $X_{F1}, Y_{F1}$ AS FOLLOWS:
$X_{F1} \mp (1/256)Y_{F1}$ IS NEW $X_{F1}$
$Y_{F1} \pm (1/256)X_{F1}$ IS NEW $Y_{F1}$
SIMILARLY UPDATES $X_{F2}$ AND $Y_{F2}$, $X_{F3}$ AND $Y_{F3}$, — — — —
— — — $X_{F9}$ AND $Y_{F9}$
UPPER SIGNS GIVE LEFT ROTATION

TRANSLATION OPTIMIZER

[42] COMPUTE $x$ AND $y$ AS FOLLOWS:
$X_1 - X_{F1} + X_2 - X_{F2} + \cdots$
$\cdots + X_9 - X_{F9} = x$
$Y_1 - Y_{F1} + Y_2 - Y_{F2} + \cdots$
$\cdots + Y_9 - Y_{F9} = y$
NOW UPDATES $X_{F1}$ AND $Y_{F1}$
$X_{F1} + (x/9) = $ NEW $X_{F1}$
$Y_{F1} + (y/9) = $ NEW $Y_{F1}$
SIMILARLY UPDATES $X_{F2}$ AND $Y_{F2}$ — — — $X_{F9}$ AND $Y_{F9}$

VARIANCE EVALUATOR

[43]
$V_1 = (X_1 - X_{F1})^2 + (Y_1 - Y_{F1})^2$
$V_2 = (X_2 - X_{F2})^2 + (Y_2 - Y_{F2})^2$
$V_9 = (X_9 - X_{F9})^2 + (Y_2 - Y_{F2})^2$
$V_1 + V_2 + \cdots V_9 = V_{TOTAL} = V$
$V - V_{STORED} = \Delta V$
THEN UPDATE $V_{STORED}$

Fig. 6

| 8 CRITERIA CONSIDERED | TRUTH TABLE FOR θ-CYCLE CONTROL | | | | | | | | | | | |
|---|---|---|---|---|---|---|---|---|---|---|---|---|
| ΔV | ≤0 | >0 | ≤0 | >0 | ≤0 | >0 | >0 | ≤0 | >0 | ≤0 | | |
| 4L MARKER | | | YES | YES | | | | | | | | |
| 1L MARKER | | | | | YES | YES | | | | | | |
| 1R MARKER | | | | | | | YES | YES | | | | |
| 4R MARKER | | | | | | | | | YES | YES | | |
| θ-START | NO | NO | YES | YES | YES | YES | YES | YES | YES | YES | | |
| θ-END | | | NO | NO | NO | NO | NO | NO | NO | NO | YES | YES |
| FIT COUNTER | | | | | | | | | | | <2 | =2 |
| MUST SET → | 4L ALSO SET θ-START FLAG | 4R ALSO SET θ-START FLAG | 4L | 1R | 1L | 1R ALSO SET θ-END FLAG | 1L ALSO SET θ-END FLAG | 1R | 1L | 4R | 4EN | PM |

<br>FIRST CYCLE | INTERMEDIATE θ-OPTIMIZING CYCLES | LAST CYCLE

Fig. 7

| 7 CRITERIA CONSIDERED | TRUTH TABLE FOR X-CYCLE CONTROL | | | | | | | | | | |
|---|---|---|---|---|---|---|---|---|---|---|---|
| ΔV | ≤0 | >0 | ≤0 | <0 | ≤0 | >0 | >0 | ≥0 | >0 | ≥0 | |
| 4EN MARKER | | | YES | YES | | | | | | | |
| 1EN MARKER | NO* | NO* | | | YES | YES | | | | | |
| 1SH MARKER | | | | | | | YES | YES | | | |
| 4SH MARKER | | | | | | | | | YES | YES | |
| X-START | NO | NO | YES | YES | YES | YES | YES | YES | YES | YES | |
| X-END | | | NO | NO | NO | NO | NO | NO | NO | NO | YES |
| MUST SET → | 4EN ALSO SET X START FLAG | 4SH ALSO SET X START FLAG | 4EN | 1SH | 1EN | 1SH ALSO SET X END FLAG | 1EN ALSO SET X END FLAG | 1SH | 1EN | 4SH | 4L |

*IF 1EN IS SET SET 4EN NOT 4SH DON'T SET FLAG

FIRST CYCLE | INTERMEDIATE CYCLES | LAST CYCLE

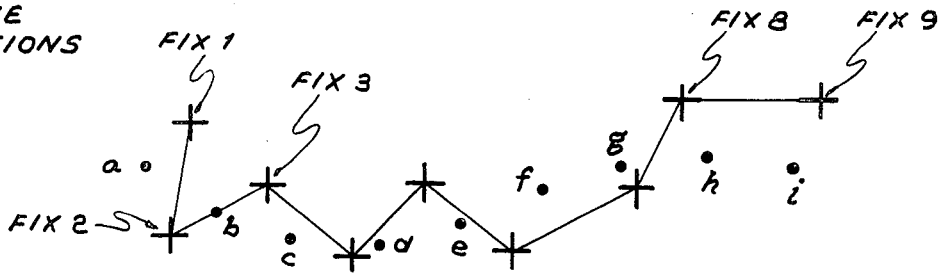
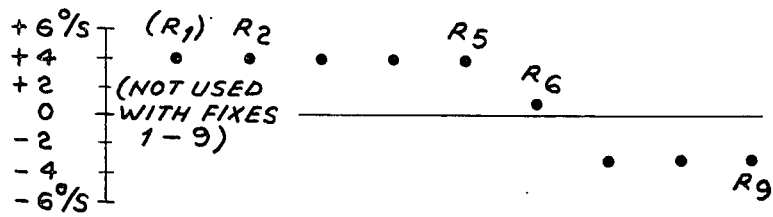
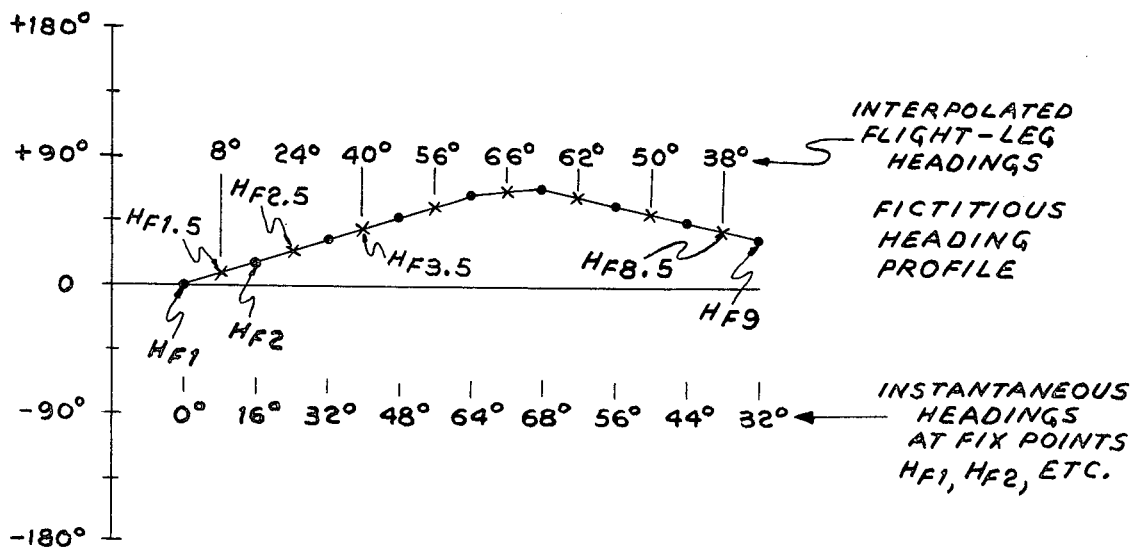
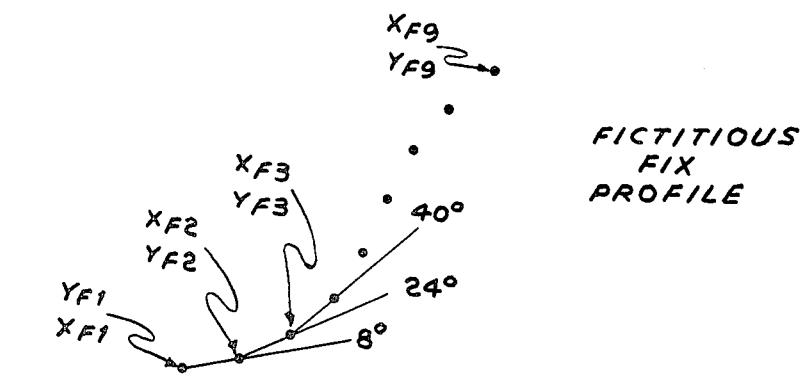
Fig. 8

AIR-TRAFFIC REGULATING SYSTEMS

This invention relates to air-traffic regulation systems and is especially suited for such systems designed to provide "IPC" service (intermittent positive control service) to properly equipped VFR aircraft. More particularly this invention provides an improved method and means for deriving aircraft "flight-heading" (ie course actually made good) and/or for predicting future aircraft position based on many imprecise radar fixes plus suitable cooperatively reported data from the aircraft.

IPC services will likely be used by a much higher percentage of moderate-cost general aviation aircraft than the present positive-control systems. Hence the specifications of "equipment needed to qualify for IPC service" must be limited to a rather small amount of low-cost apparatus. Also there will for many years be a fairly high percentage of VFR aircraft with less than the minimum IPC-qualifying equipment (but carrying present day beacons which give fairly good secondary radar returns) flying with little or no ground control in the same airspace as those under IPC control. Furthermore even the aircraft under IPC control must be expected to exercise much more free choice in their maneuvers than is now exercised in positive control airspace, because of their need to thread between the other aircraft on a "see and be seen" basis, and also because the basic premise of IPC is to allow maximum freedom to the controlled aircraft, so that these can fly essentially on an ordinary VFR basis with only rare interference with their freedom when this becomes essential to protect them. Another complicating factor is a requirement that headings used for predicting future positions should not only be reasonably accurate but also must be very current—ie up to date. (This stems both from the likelihood that a new turn may be started at any moment with no warning, and also from the fact that nearly all IPC interventions will be made on a last minute basis).

All these factors complicate the problem of predicting future aircraft positions. On the one hand turns may be started by any aircraft at any moment, while on the other hand the imprecise secondary radar fixes prevent the rapid determination of reasonably accurate flight-headings from just two (or even three) consecutive fixes. Combining of many fixes into one "mean heading" derivation can greatly improve the heading accuracy, but such heading is necessarily very far from current. One object of this invention is to provide a new method and means for flight-heading determination which can give flight headings having both useful accuracy and extremely good currency, and to do this with minimum burden on the IPC-qualifying aircraft.

It has been proposed that all aircraft desiring IPC service be required to report their headings at short intervals, eg once per radar sweep; but it appears undersirable to impose such a requirement if it can be avoided, because flux-gate compasses or gyro compasses are not carried on most general aviation aircraft and represent a higher level of complexity and cost than is desirable. Also their readings represent only aircraft fuselage headings rather than flight-headings and thus are not directly usable without recent calibration computations. In accordance with one very important feature of the present invention, therefore, the new type of discretely addressable beacons (DABS) which is to be required for IPC service will periodically report the aircraft's turn rate, rather than its heading; and a considerable number of these turn-rate reports will be computer-processed together with a corresponding number of radar-derived fixes in such a way as to produce a heading having three important characteristics:

a. It is a true flight-heading rather than an aircraft heading
b. It is reasonably accurate due to the error-reducing effect of combining many fixes in deriving the heading
c. It is extremely current because of the currency of the turn-rate reports.

After this heading has been derived it is a relatively simple matter to predict future positions of the aircraft, taking the starting point as simply the average of the last two fixes if the turn-rate reporting process involves a delay equal to half the period between fixes (or as the average of the last three fixes if such reporting involves a delay equal to a whole inter-fix period, so that the derived heading actually is the direction of the airplane ground track at the time of the penultimate fix). The ground speed used for the future position predictions can be derived from a number of recent fixes, assuming that winds aloft are known and that the pilot holds his airspeed constant, so that the primary sources of change in ground speed are changes in altitude or changes in flight heading large enough to cause changes in drift rate.

At this point it should be noted that usually the main objective is future position prediction. If this is the only objective, the procedure and means for deriving flight-heading, finding an initial starting point, and deriving ground speed are merely steps in one process of position prediction. But the present invention also contemplates that the separate derivations of heading, starting point, and ground speed may all be combined in one overall mathematical processing operation which directly yields estimated future position without first explicitly finding flight-heading. Accordingly it is a broad object of the invention to derive usefully accurate future-position predictions by mathematically combining an extensive sequence of radar-derived fixes with a corresponding extensive sequence of cooperatively reported turn rates. By "an extensive sequence of fixes" I mean at least five successive fixes (preferably six or more, covering five or more flight segments and giving about 1/6 or less of the uncertainty which would be given by just two successive fixes).

It is true that the preferred ways of combining many fixes and turn rates involve finding a last flight-heading and then figuring future positions from this heading plus other data. This approach is believed to be practically as accurate as the best all-at-once mathematical processing leading directly to future positions, and it has the important advantages of simplicity, greater flexibility to accomodate changes, easier intuitive comprehension (for less likelihood of undetected errors in programming) and especially the availability of heading as a by-product. The drawings (and the detailed descriptions based thereon) therefore, present three embodiments (and two variants thereof) all designed to derive flight-headings and then use these for position prediction. But methods of accomplishing the same predictions without explicitly deriving flight-heading are feasible if desired.

Figure 1A:
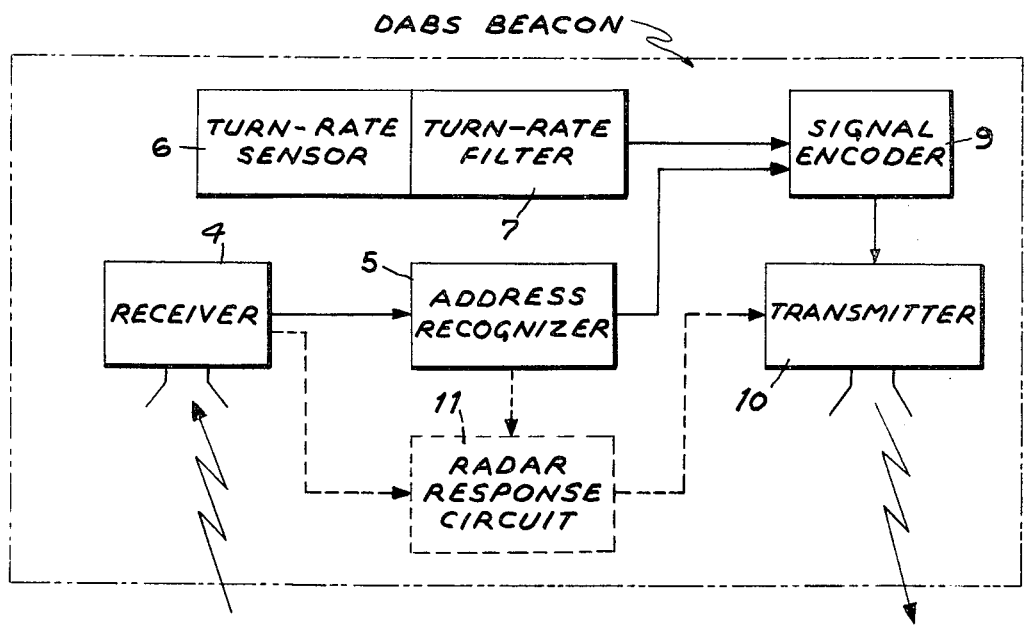
Figure 4:
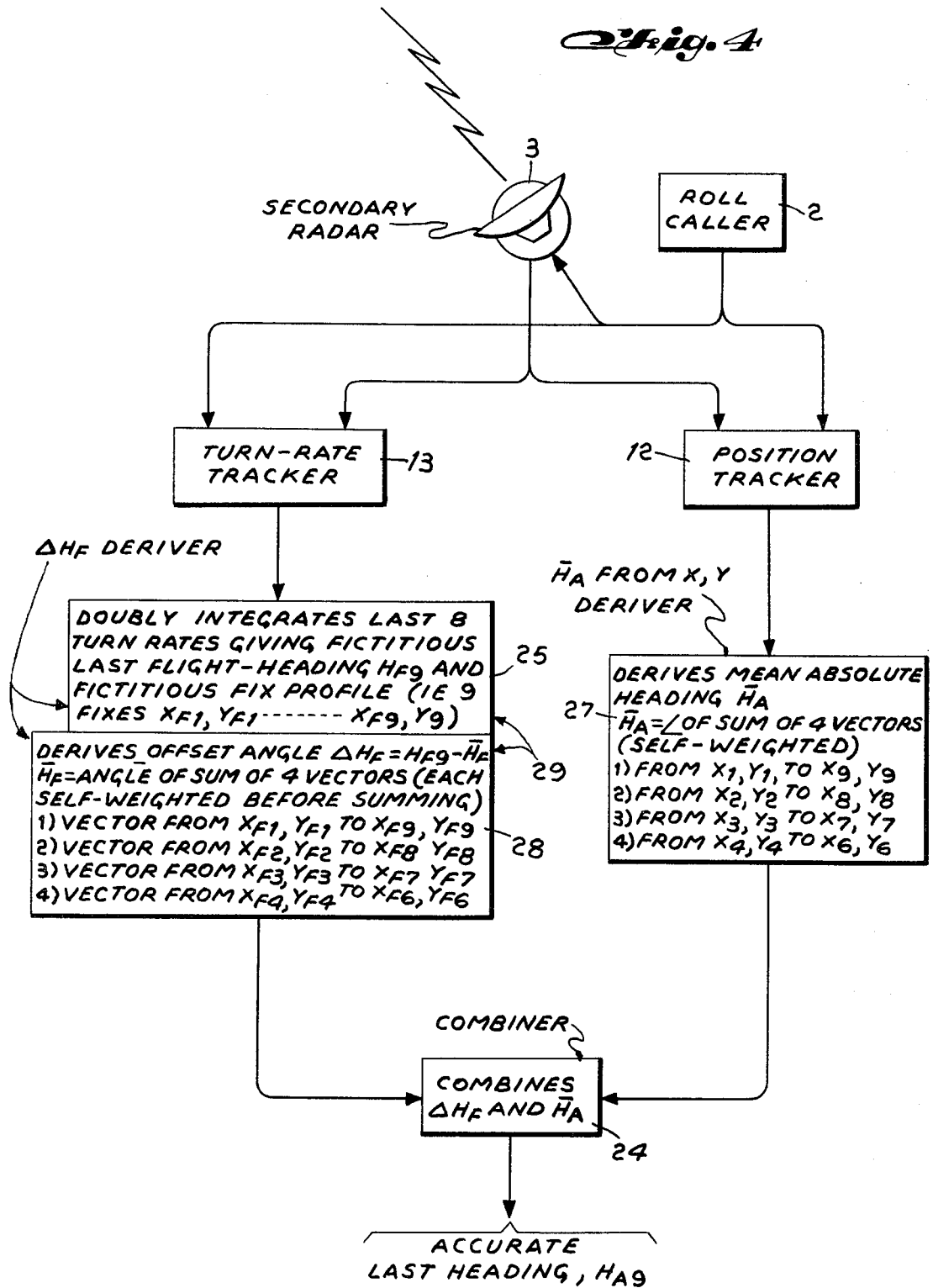

In the drawings FIG. 1 shows the simplest embodiment using single integration, with FIG. 1A or 1B showing more detail of the DABS beacon portion of FIG. 1: FIG. 2 represents an obvious equivalent of the FIG. 1 embodiment; FIG. 3 represents a second embodiment using double integration and having circuitry which might be called a pattern matcher(angular match only); FIG. 4 represents an obvious equivalent of FIG. 3 but in this form no explicit pattern matcher is evident;FIG. 5 represents a third embodiment organized generally like FIG. 3 but using a very complete form of pattern matcher, which adjusts not only the rotation but also the scale factor and the translational positioning of the fictitious fix profile for a least-variance fit to the radar-derived sequence of fixes;FIG. 5A shows more detail of the pattern matcher included in FIG. 5; FIG. 5B shows more detail of the four major mathematical processing units of FIG. 5A; FIGS. 6 and 7 are so-called "truth tables" for the cycle-control units of FIG. 5A; FIG. 8 is a set of interrelated graphs for use with FIGS. 1–7 to clarify the relationships between actual aircraft positions, radar fixes, turn-rate reports and two types of fictitious flight profiles ( a heading-type profile and a fix-type profile).

Referring to FIG. 1 and FIG. 1A these show a very simple embodiment of the position prediction subsystem of the present invention, embedded in the air-traffic-regulating system which offers IPC service to those VFR aircraft carrying the new "DABS" beacons (discretely addressable beacons with automatic reporting of selected data, and with reception and display of ground-to-air data-link signals—to facilitate rapid automated transmission of control commands to the pilot of any selected IPC aircraft). FIG. 1A shows those portions of the DABS beacon which are relevant to the present invention, the radar response circuit being shown in dashed lines because theoretically it is not essential (since in principle the invention could be applied to a system deriving its fixes from primary radar instead of the secondary radar practically contemplated).

In accordance with the invention the DABS beacon 1 of FIG. 1 (shown more fully in FIG. 1A) is designed to report turn rates as instantaneous or smoothed rates (in degrees per second) or as finite heading changes (in degrees since the last radar sweep). This reporting occurs at short intervals under control of the roll caller 2 on the ground. This roll caller 2 periodically causes the transmission of discrete address signals from radar 3 to beacon 1 where they are received by receiver 4, decoded by address recognizer 5. This causes units 6, 7, 9 and 10 to report turn rate, in a way self evident from the drawing (but see also some further discussion of this action hereafter in connection with a discussion of filtering vs delays).

Although the secondary radar operation is not part of the present invention, it is assumed that the radar responses of beacon 1 are controlled(to eliminate sidelobe responses and to more sharply restrict the angular response sector) by the standard expedient of radiating two successive patterns from the radar 3 on the ground, and by designing response circuit 11 to respond (via transmitter 10) only when (a) the inhibitor-pattern signals are weaker than narrow interrogating-beam signals, and also (b) the recognizer has recognized the aircraft's individual address or some group address requiring this aircraft to respond.

Normally both the radar responses which give fixes and the turn-rate reports (which are to be combined therewith in accordance with this invention)are transmitted by beacon 1 once per radar sweep. It may seem desirable to skip radar responses on every other sweep during certain unusual times when another IPC aircraft is at exactly the same range as the aircraft carrying this beacon and angularly so close that separate interrogations on alternate sweeps are needed for good angular resolution but in the system here disclosed such skipping is not done. For definiteness and for clarity and simplicity of explanation it is assumed throughout the following descriptions of this specification that the radar sweep period (hereafter called $\tau$ or Tau) is exactly four seconds. Then a radar fix is obtained for each aircraft in the system every four seconds by radar 3 and position tracker 12; also a turn-rate report is sent from each IPC aircraft in the system once each four seconds to radar 3 and thence to turn-rate tracker 13 (each such turn-rate report being sent at nearly the same instant when the corresponding radar fix is obtained). Position tracker 12 associates together the successive fixes for each aircraft (which are acquired on successive radar sweeps) converts them to X,Y form and constantly keeps in storage the last nine X, Y fixes for each aircraft,indexed by aircraft ID. Similarly the turn-rate tracker 13 keeps in storage the last 8 turn rates for each air craft, indexed by aircraft identity. Each time a new turn-rate report arrives, tracker 13, after updating its set of 8 turn rates sends this set to the deriver 14 which is intended to derive from these turn rates a "mean fictitious flight-heading" $\bar{H}_F$ and a "last fictitious flight-heading" $H_{F9}$.

To do this the integrator unit 15 of deriver 14 integrates these turn rates, ie accumulates them positively or negatively (with angles expressed as values between $-180°$ and $+180°$), starting at an arbitrary value of zero, and using a scale factor of 4 if the turn rates are in degrees per second (of 1 if they are in degrees per sweep period). Assume for the moment that the delay, D, caused by filter 7 (together with other elements of the beacon) is negligible, the sluggishness of the aircraft itself being sufficient. Then the last eight turn rates reported (R2, R3, – R9—see FIG. 8) represent the instantaneous turn rates at the last eight fix instants (see FIG. 8) and their integrals (ie cumulative subtotals) give the nine fictitious flight-headings at the last nine fix instants, (the first such instantaneous flight-heading $H_{F1}$ being arbitrarily taken as zero). With such a zero-delay filter the eight flight headings which constitute the fictitious flight profile are obtained by interpolation (to 8 instants representing the eight mid-leg points) each being the average of the headings at the preceding and following fix instants. If the delay of filter 7 amounts to just half a radar sweep period, no interpolation is needed. In such case the instantaneous flight-headings obtained by the integration (cumulation) process can be directly used as the fictitious mid-leg flight headings $H_{F1.5}$, $H_{F2.5}$, $H_{F8.5}$, which are collectively referred to as the fictitious flight profile. For filter delays between zero and a half sweep period the mid-leg points can be found by linear interpolation (like the averaging above described for a zero-delay filter but with unequal weightings of the two headings averaged). For delays exceeding half a sweep period, the zero starting point is taken as being one sweep period ahead of the first fix instant and the "first" turn-rate report $R_1$ (received at about the time of the first fix $X_1$, $Y_1$) is used (instead of being discarded as assumed in the above discussion and in FIG. 8). In all cases where the delay in filter 7 is any appreciable fraction of a sweep period (including delays in the sensor and in the reporting chain) the last reported turn rate will be somewhat out of date when received, and thus the "last fictitious flight heading" $H_{F9}$ will actually apply to some flight instant earlier than fix $X_9$, $Y_9$. But for convenience such last fictitious heading will still be referred to as $H_{F9}$.

After the integrator 15 of deriver 14 has formed the eight mid-leg headings constituting the fictitious flight-heading profile and also formed the last fictitious flight heading, the averaging unit 16 of this same deriver calculates the simple arithmetic average of the angles (in degrees) which represent these mid-leg flight headings. In the embodiment of FIG. 1 this simple average is chosen as the convenient "mean fictitious flight-heading" $\bar{H}_F$. Thus deriver 14 has derived both $H_{F9}$ and $\bar{H}_F$.

At about this same moment radar 3 and position tracker 12 obtain a new fix on the aircraft carrying beacon 1, and this tracker sends the 9 latest fixes to the mean absolute flight-heading deriver 17 which now derives from these fixes a mean absolute heading $\bar{H}_A$. In the embodiment of FIG. 1 this is merely the overall heading $H_{OV}$ from the first one of the latest 9 fixes to the last one. If we call the first fix $X_1$, $Y_1$ and call the last fix $X_9$, $Y_9$, then $H_{OV}$ is simply calculated as follows:

$H_{OV}$ = arctan $(Y_9 - Y_1) / (X_9 - X_1)$ with the quadrant determined by the signs of $(Y_9 - Y_1)$ and of $(X_9 - X_9)$.

Our choice of $H_{OV}$ as a convenient "mean absolute flight-heading" agrees with our previous choice of the simple arithmetic mean of the eight fictitious mid-leg flight-headings (in degrees) as a convenient "mean fictitious flight-heading". It can be shown that if ground speed is constant and if fixes are error-free and equally spaced in time then the overall heading $H_{OV}$ would be equal to the arithmetic average of the flight-leg headings in degrees. Theoretically this is valid only when all the leg-to-leg changes of heading are very small, but practically it holds true within a fraction of a degree even if the differences between headings of successive legs are as large as 30°. (With the assumed four second sweep period this would require an unusually high turn rate of 450° per minute.)

Because of the arbitrary zero starting value used by integrator 15 in deriving the fictitious profile of mid-leg flight headings from the turn-rate reports, the flight headings may all be wrong by a substantial angle $\epsilon$, and the mean fictitious heading $\bar{H}_F$ will then be wrong by this same angle $\epsilon$. Deriver 18 subtracts $\bar{H}_A$ from $\bar{H}_F$ to find $\epsilon$, and combiner 19 then corrects the fictitious last flight-heading $H_{F9}$ by substracting $\epsilon$ from it, thus yielding a reasonably accurate and very current last absolute flight-heading $\bar{H}_{A9}$.

This last heading $\bar{H}_{A9}$ is now sent to position predictor 20 where it is combined with "other data" to predict future position in any well-known manner. The "other data" may include ground speed, or reported air speed plus known winds aloft, (or at worst it may be an estimated "typical ground speed" based on the aircraft's type and the weather. The exact form of such additional speed data and the source from which it is obtained are not essential features of this invention since many forms of position predictors are known, requiring different forms of additional data (in addition to heading) and since methods and means for obtaining such additional data are also well known. Besides the heading $H_{A9}$ and the speed data from some other source, some sort of current position of the air craft is needed for use as the starting point of the future position prediction. Usually it is satisfactory just to use the last radar-derived fix, because the present position uncertainties are small compared to uncertainties in flight-heading and speed. But it may be that the last flight-heading available, $H_{A9}$ is not completely current, but is, for example, behind by half a radar sweep because filter 7 (or circuit 8 which is here considered as a special kind of filter) has an effective zero-frequency delay of ½ $\tau$; then it is convenient and very desirable (a) to use the average of the last two fixes as the starting point (b) to use the last heading $H_{A9}$ as the heading at that point, and (c) to use an instant ½ $\tau$ seconds before the latest radar fix as the starting time for the position predictor. (if the last heading $H_{A9}$ is out-of-date by a complete radar sweep period $\tau$ the average of the last three radar fixes is used as the starting position and $\tau$ seconds before the latest radar fix is used as the starting time).

The above outlined form of position predictor 20 therefore computes future X and Y values $t$ seconds in the future by the following simple formulae (assuming a filter delay of ½ $\tau$ and letting $S_g$ represent groundspeed (provided from some outside source):

$X(t) = S_g (\cos H_{A9}) (t + ½ \tau) + ½ (X_9 + X_8)$
$Y(t) = S_g (\sin H_{A9}) (t + ½ \tau) + ½ (Y_9 + Y_8)$ Another possible form finds $S_g$ from the radar fixes as follows and then applies this in the above formulae $A = [(X_9-X_6)^2+(Y_9-Y_6)^2]^{1/2} +$
$\quad [(X_6-X_4)^2+(Y_6-Y_4)^2]^{1/2} +$
$\quad [(X_4-X_1)^2+(Y_4-Y_1)^2]^{1/2}$
$B = [(X_8-X_5)^2+(Y_8-Y_5)^2]^{1/2} +$
$\quad [(X_5-X_2)^2+(Y_5-Y_2)^2]^{1/2}$
$C = [(X_7-X_5)^2+(Y_7-Y_5)^2]^{1/2} +$
$\quad [(X_5-X_3)^2+(Y_5-Y_3)^2]^{1/2}$
$D = [(X_6-X_4)^2+(Y_6-Y_4)^2]^{1/2}$
$T_A = T_9 - T_1 ; T_B = T_8 - T_2 ; T_C = T_7 - T_3 ; T_D = T_6 - T_4$
where $T_1, T_2, ... T_9$ are the times of the radar fixes.
$S_G = (AT_A + BT_B + CT_C + DT_D)/(T_A^2 + T_B^2 + T_C^2 + T_D^2)$ Filter 7 should discriminate strongly against turn rate fluctuation components of $(1/\tau)$ $H_z$ or higher. But its zero frequency delay should be kept below three seconds if practicable (at all events no more than five seconds). In terms of $\tau$ its zero-frequency delay should be below $\tau$ preferably below 0.5 $\tau$.

The discrimination against $(1/\tau)$ Hz should be at least 10dB compared to the DC or steady state response, and preferably should be 12 (or better yet 15) dB. It should be understood that both the delays and the discrimination against $(1/\tau)$Hz components here discussed, refer not just to the separate filter 7 but to the total filtering and delays of the complete turn-rate reporting apparatus of the beacon (including sensor, filter, and signal encoder). The point where the recognizer 5 gates the turn rate signal to let it pass through toward the transmitter should preferably be some point after all storage elements of the filter. FIG. 1A shows the recognizer 5 gating the encoder. Thus turn rates are continuously being sensed by sensor 6, filtered by filter 7 and encoded in encoder 9. But no turn-rate signals are delivered to the transmitter 10 until address recognizer 5, recognizing a suitable address requiring a response by beacon 1, triggers the encoder to make it read out.

FIG. 1B shows a preferred form for beacon 1. Filter 7 of FIG. 1A is here replaced by a cumulate-and-dump circuit 8 of wellknown type. The accumulator portion of element 8 may be any one of the known types commonly used in such cumulate-and-dump circuits which will build up some sort of measurable value at a rate proportional to the turn rate sensed by turn-rate sensor 6 (so that the final value built up during one inter-report period $\tau$ represents $\Delta\theta$ the total heading change during such period). The dump function (resetting the accumulator to its starting condition for the next cycle after said final value has been delivered to the encoder for reporting) is assumed to be performed by circuitry not distinctly separate from the accumulator circuitry. Unit 8 is a much more effective filter than the RC filter 7 since it introduces only ½ $\tau$ of delay and yet fully eliminates fluctuations of $(1/\tau)$ Hz, $(2/\tau)$ Hz etc. The turn rate reports of FIG. 1B are in the form of $\Delta\theta$(degrees of heading change since the last turn-rate report). Under the previously-stated assumption that the sweep period Tau is always eactly four seconds, such a report is equivalent to average turn rate $\bar{\omega}$ (in degrees per four seconds) averaged over the last four seconds. But if the sweep period were permitted to lengthen slightly, the reported turn rate $\Delta\theta$ (ie degrees of turn since the last report) would increase.

The present invention does not address the problem of operating with skipped radar fixes and/or turn-rate reports. It assumes that such skipping is not permitted even if desirable for improving radar accuracy. (Any skips occurring through equipment failure are breakdowns and handled by human intervention and emergency rules if necessary.) But it appears that when consideration is given to skipping as a desirable mode of operation a beacon like FIG. 1B might very likely allow more accurate operation under skip conditions.

The embodiment of FIG. 1 may be constructed in the form of several functional blocks each performing a certain function as suggested by the figure. But this embodiment would more likely be realized in the form of one large fast computer with one or a few arithmetic units. In this case FIG. 1 is a kind of flow chart. The data may be stored in several memories, individually associated with special purpose processors or in one available to all processing functions. In the case of the trackers 12 and 13, for example, the stored fix points and turn rates which these trackers "keep in storage" as shown by the legends need not be stored in storage elements physically located in the trackers. Even if trackers 12 and 13 are physically separate computors it is likely that the storage of a least the position fixes should be in a central memory of the main computor which performs most of the other traffic regulating functions, because of the wide utility of these fixes and the need to consult them for very many functions as well as the need to display them continually or on demand for very many purposes.

It should also be understood that fix storage need not be made directly in the form of X and Y values directly indexed against aircraft identity (ID) as implied by the simplified legends on tracker 12. Storage may be in the form of $\rho$ and $\theta$ as derived from radar 3 (or translated to refer to some other origin). Or only the last fix may be stored in explicit X,Y form, with the preceding ones stored in the form of differences with respect to such last fix. Similarly the turn-rate data may be stored directly as eight successive turn rates (degrees per four seconds, or degrees of change since the last report—about four seconds ago) or it may be more convenient to store these as integrals or cumulative sub-totals (degrees of change accumulated since an initial instant before the first of the last eight reports) or in some other form. All fixes may be indexed directly by ID or may be indexed by roll-call sequence, by location or by any (or several) forms of co-existing string indexes. The legends on trackers 12 and 13 merely represent a requirement that the fixes (or turn-rate reports) be stored or easily reconstructable from data which is kept in storage, and be so indexed that the last 9 fixes for a given aircraft, and the corresponding turn rate reports can be associated together (by this I mean to include indexing such that the turn rate reports can be brought together and processed and the results of this processing can be conveniently combined with the fixes—or with some results from processing these).

Referring to FIG. 2, this shows a variant of FIG. 1 in which the problem is approached differently. The computations don't try to find $\epsilon$ (the overall, arbitrarily large, orientation error, present in all the headings of the fictitious heading profile, which stems from the arbitrary and false 0° starting heading assumed in the integration process). Instead the turn-rate data is processed by itself to find an offset angle $\Delta H_F$ characteristic of the shape of the recent flight pattern. Such offset angle represents the adjustment needed to convert a mean heading to a final one (ie the difference between the overall or mean heading of the recent flight pattern and its final instantaneous heading). Once this offset angle has been found (from the turn-rate reports alone, using no comparisons with the fixes) then an absolute mean derived from the fixes alone, and reasonably accurate because it uses two widely spaced fixes, can be adjusted to represent the instantaneous last heading rather than the overall mean heading merely by adding to it this shape-dependant offset angle found from the turn-rates. Thus this shape-derived correction $\Delta H$ takes the properly oriented and fairly accurate mean heading $\bar{H}_A$ and gives it currency by adjusting it for the difference between mean and final headings.

In spite of the very different approach which led to the embodiment of FIG. 2 and in spite of the fact that its block diagram is quite different from that of FIG. 1, a comparison of the mathematics of FIGS. 1 and 2 makes it clear that these are obvious equivalents. Both embodiments calculate the same three angles $\bar{H}_A$, $\bar{H}_F$, and $H_{F9}$ from the very same input data in the very same way. In FIG. 1 $(\bar{H}_F - \bar{H}_A)$ is subtracted from $H_{F9}$ to find the desired $H_{A9}$ FIG. 2 finds it by adding $(H_{F9} - \bar{H}_F)$ to $\bar{H}_A$. These are obviously equivalent even though they resulted from different ways of looking at the problem.

Both the embodiments of FIGS. 1 and 2 can give very good results under proper conditions. The ground speeds must be approximately constant. The turn-rate reports must be equally spaced in time with no turn rate reports skipped. The mid-leg headings found by singly integrating the turn rates shouldn't differ by more than 30° from one leg to the next, and the total change of heading accumulated during the nine-fix flight pattern shouldn't exceed plus or minus 170°. Note: simple arithmetic averaging of the angle values becomes much less simple if modulo 360 jumps are made (eg 361° becoming 1° or −181° becoming +179°). This is the reason why integrator 15 should accumulate both positively and negatively, with the accumulated angle remaining between −180° and +180°, and it is one reason for limiting the total 9-fix heading change to less than 170°. Under these conditions the FIG. 1 or 2 embodiments (using 9 fixes as illustrated) give headings whose 1σ uncertainties are less than 19 percent of those of a conventional flight-heading derived from only the last two radar fixes. (using 15 fixes the percentage would be less than 11 percent.)

The embodiment of FIG. 3 gives still more accurate headings because it uses many pairs of fixes optimally weighted, to derive the mean heading $\bar{H}_A$ (instead of just the first and last fixes). Also it has no limitations as to changes of heading from one leg to the next, and it permits the total heading change accumulated during the 9-fix flight pattern to be as high as plus (or minus) 510°. FIG. 3 is organized like FIG. 1, but double integrator 25 replaces single integrator 15, $\bar{H}_F$ deriver 26 replaces averaging unit 16, and $\bar{H}_A$ deriver 27 replaces deriver 17. Trackers 12, 13 (plus everything thereabove) and ε-deriver 18 and combiner 19 (plus everything therebelow) are understood to be the same as in FIG. 1. The beacon 1 (not shown in FIG. 3) may be as shown in FIG. 1A or preferably FIG. 1B. The double integrator 25 performs the first integration in the same way as integrator 15, thus deriving $H_{F9}$ and a set of eight mid-leg fictitious flight headings $H_{F1.5}$, $H_{F2.5}$, .....$H_{F8.5}$ as previously explained. (The relations shown in FIG. 8 apply as before if beacon 1 is per FIG. 1A and has negligible delay in its filter 7). Then integrator 25 performs a second integration on the set of eight mid-leg headings to convert these to fictitious fixes as follows: first it computes 8 unit vectors corresponding to these eight headings. Then starting with a first fictitious fix point $X_{F1}$, $Y_{F1}$, arbitrarily taken at the origin, it adds on the eight unit vectors vectorially one at a time, thus finding the eight other fix points $X_{F2}$, $Y_{F2}$, $X_{F3}$, $Y_{F3}$, ...$X_{F9}$, $Y_{F9}$. The nine fictitious fix points resulting from this second integration constitute the "fictitious fix profile". This fix profile and the fictitious last heading $H_{F9}$ both have the same arbitrary error ε. The fictitious fix profile is now handed over to the $\bar{H}_F$ deriver 26, which processes these nine points (nine sets of X and Y values) to derive therefrom a mean heading as follows: Taking these points in ordered pairs, it computes vectors joining the points of each pair, beginning with the two extreme points (from $X_{F1}$, $Y_{F1}$ to $X_{F9}$, $Y_{F9}$) then using the two points just inside these extreme points (from $X_{F2}$, $Y_{F2}$, to $X_{F8}$, $Y_{F8}$) and continuing to points farther inward until finally it joins the last pair (from $X_{F4}$, $Y_{F4}$, to $X_{F6}$, $Y_{F6}$). The one center point $X_{F5}$, $Y_{F5}$ cannot be paired; this occurs because the example shown uses an odd number of fixes; this central point is thus not used.

Next the four vectors so constructed are "self-weighted". In other words each one is multiplied by its own magnitude, so that the resulting weighted vectors, while keeping the same angular direction as before, have new magnitudes which are the squares of the previous magnitude. These self-weighted vectors are now vectorially summed, and the angle of the resulting sum vector is used as the "mean fictitious flight-heading" $\bar{H}_F$.

The operation of the $\bar{H}_A$ deriver 27 is identical to that above described for deriver 26 but the nine fixes processed in 27 are the last nine actual radar-derived fixes from tracker 12. The angle derived from these is therefore the "mean absolute flight-heading" $\bar{H}_A$.

Thereafter the operation of FIG. 3 is like that of FIG. 1. The ε deriver 18 substracts $\bar{H}_A$ from $\bar{H}_F$ to find ε, then combiner 19 subtracts ε from $H_{F9}$ to get the desired absolute last heading $H_{A9}$; finally $H_{A9}$ goes to the future position predictor (shown in FIG. 1 as position predictor 20) where it is combined with other data to predict the aircraft's future position as in FIG. 1.

It is informative to analyze the overall function performed by the $\bar{H}_F$ deriver 26, the $\bar{H}_A$ deriver 27, and the ε deriver grouped together and considered as a single "pattern matcher" 27a. Into this unit is fed a fictitious set of 9 fixes (called a "fictitious fix profile") from double integrator 25, and a real set of 9 fixes from position tracker 12. Then out of this unit 27a comes ε, the amount of rotation of the fictitious fix profile which would give the best fit to the real, but noisy, fixes (if some quick-acting size-adjuster and X,Y displacer were continually keeping size and translation optimized while this best rotation angle ε was being slowly sought). The best fit here found has not been rigorously shown to be identical with the least-variance fit of the complex pattern matcher 31 shown in FIGS. 5, 6 and 7, but if it is not identical the differences are negligible for practical cases where the sum of all heading changes made during the whole flight pattern represented by the fictitious flight profile is less than 360°.

FIG. 4 is a variant of FIG. 3. It is based on the general approach of FIG. 2 (where ΔH is found from turn rates alone with no reference to the fixes). But it uses the more sophisticated double integration processing of FIG. 3 so that the resulting "profile" is a fictitious pattern of fixes. This pattern has a false location (X and Y), a false scale of size, and a false general orientation; but its shape is correct neglecting errors in the turn rate reports. From this shape an accurate value of the offset angle ΔH is found. A comparison of the mathematics involved in the operation of FIG. 4 with that of FIG. 3 shows that these are obvious equivalents. It should be noted however that no form of "pattern matcher" can be seen in FIG. 4 which would correspond to 27a of FIG. 3. Referring to FIG. 4, its trackers 12, 13 are like those of FIG. 1 and all other elements shown above these in FIG. 1 are understood to be included in FIG. 4. Also predictor 20 of FIG. 1 is understood to be provided below combiner 24 to receive its output $H_{A9}$. Double integrator 25 of the $\Delta H_F$ deriver 29 in FIG. 4 is identical to the integrator 25 of FIG. 3. Note that both outputs of this integrator 25 are used within the $\Delta H_F$-deriver, so that no output flow paths to other units are explicitly shown.

The turn rates from tracker 13 are processed in integrator 25 to yield a "fictitious fix profile" (9 fictitious fixes) plus a "fictitious last heading" $H_{F9}$ just as in FIG. 3. The lower unit 28 of the $\Delta H_F$ deriver performs two functions: first it derives a mean heading $\bar{H}_F$ from a fictitious fix profile (just like the $\bar{H}_F$ deriver 26 of FIG. 3) and then it subtracts $\bar{H}_F$ from $H_{F9}$, yielding $\Delta H_F$. Thus the whole $\Delta H_F$ deriver 29 derives $\Delta H_F$ from just the turn-rates.

The $\bar{H}_A$ from X, Y deriver 27 of FIG. 4 finds $\bar{H}_A$ from the last nine radar fixes provided by tracker 12 exactly as in FIG. 3. Combiner 24 now adds $\bar{H}_A$ and $\bar{H}_F$ to yield a reasonably accurate and current last absolute heading $H_{A9}$. This last heading is used with other data in position predictor 20 of FIG. 1 to predict the air craft's future positions as explained for FIG. 1.

FIG. 5 with FIGS. 5A, 5B, 6 and 7 illustrates an embodiment organized generally like FIG. 3 but using a much more complex pattern-matcher 31. This matcher 31 not only finds the rotation angle $\epsilon$ needed for a best fit of the fictitious fix profile to the real set of fixes, but in doing so it also optimizes the scale change, the X displacement and the Y displacement needed for such best fit. Also it determines the goodness of the fit (ie the total variance). In FIG. 5 this total variance and the values of scale change and displacement are not used but in a practical traffic regulating system these quantities would probably be found useful.

Because the particular quasi-D.D.A form of pattern matcher shown in FIGS. 5A, 5B uses significant amounts of computer time to correct large initial mismatches in pattern orientation, the integrator 31 is slightly different from the integrators described earlier. The first integration performed by other integrators, like integrator 25 of FIG. 3, yields a set of headings which may be very far from correct (ie $\epsilon$ may be very large) because the 0° starting heading assumed is completely arbitrary. For use in FIG. 5 the integrator is modified to yield a more reasonable set of heading such that the "last fictitious heading" $H_{F9}$ will have a specified value $H_{est}$ (which has been estimated in advance from two earlier "last absolute headings" found during the two previous sets of calculations relating to this same aircraft).

FIG. 5 represents only those portions of the subsystem which differ from the embodiments already described; the trackers 12, 13 of FIG. 1 and everything above these, and the position predictor 20 of FIG. 1 are understood to be provided in FIG. 5.

Double integrator 31 is generally similar to integrator 25 of FIG. 3 but its first integrating process is modified as if the arbitrary starting point were intelligently preselected, thus reorienting all headings ($H_{F1.5}$, $H_{F2.5}$, ...$H_{F8.5}$ and $H_{F9}$) enough to make $H_{F9} = H_{est}$. This $H_{est}$ is derived by extrapolation from two "last absolute heading" values herein called $A_{c-1}$ and $B_{c-2}$. The value $A_{c-1}$ is the final corrected value found four seconds ago (in the course of the previous, $c-1$st, set of calculations about this aircraft) as the desired "last absolute flight-heading" $H_{A9}$ at that time. Similarly $B_{c-2}$ is the corresponding value found eight seconds ago (in the course of the $c-2$nd set of calculations) as the $H_{A9}$ at that time. The estimated value $H_{est}$ (intended to approximate the results of the current calculations) is figured as $H_{est} = 2A_{c-1} - B_{c-2}$, which represents a linear extrapolation of $B_{c-2}$ and $A_{c-1}$ to the present time. The unit 33 represents a block of memory sufficient to store these two headings $A_{c-1}$ and $B_{c-2}$ for each of the N aircraft which might be serviced by the system.

Many ways of choosing the integration starting point so the integration will end with $H_{F9} = H_{est}$ are possible. Reverse integration from $H_{F9}$ backwards is probably the most efficient, but for simplicity of explanation integrator 31 is assumed to operate as follows: (A) a trial integration is carried out (as in FIG. 3) with $H_{F1} = 0°$ to yield eight trial mid-leg headings and a trial last heading $H_{F9}$; (B) this trial value of $H_{F9}$ is subtracted from $H_{est}$ to find the required correction angle $H_{cor}$; (C) all the 8 mid-leg headings $H_{F1.5}$, $H_{F2.5}$, ... $H_{F8.5}$, and the last heading $H_{F9}$ are increased by $H_{cor}$ thus yielding the desired result from the first integration process.

FIG. 5A is a fairly detailed flow diagram of pattern matcher 31 of FIG. 5. The general plan of its operation is that scale-changer 40 and rotator 41 operate alternately on the fictitious fix points $X_{F1}$ and $Y_{F1}$, $X_{F2}$ and $Y_{F2}$, ....$X_{F9}$ and $Y_{F9}$. Both these units 40 and 41 use incremental stepping to achieve their transformations quasi-continuously. As shown in more detail in FIG. 5B the scale-changer 40 increases all X and Y values by (1/256) of their value when stepping upward (ENlarge <) and decreases these by (1/256) of their value when stepping downward (SHrink >) —see legends in scale changer 40 of FIG. 5B for the exact mathematical operations. Thus one downward step does not exactly cancel one upward step, but this is unimportant for the present use. This unit is called a "± 0.4 percent scale changer" because this is the approximate size of its steps. Similarly the "± 4 milliradian rotator" actually rotates each X,Y point to the left or to the right by slightly less than (1/256) of a radian — by arctan (1/256) to be precise — while incidentally producing a negligible scale increase (see legends in rotator 41 of FIG. 5B for exact mathematical steps).

During fast slewing of either the scale changer 40 or the rotator 41 the variance is checked only once per four steps to save time, but after passing the variance minimum the stepping reverses and the variance is checked at each step for vernier operation. Finally this vernier-mode stepping overshoots the minimum and makes just one step back to bring the rotator within half a step of the minimum.

The function of "checking the variance" (whether this is done after one step or after four) always involves successive activation of three units. If scale-changer 40 has been stepping, these are 42, 43 and 46; but if it has been rotator 41 doing the stepping the 3 units used for the "variance check" are 42,43 and 47.Such "checking" starts with translation optimizer 42 which is brought into play to figure the amounts of X and Y shifts needed for minimizing the variance and then to execute these shifts on all the X,Y points. The exact steps involved are as follows:

A. $X_1 - X_{F1} + X_2 - X_{F2} + ... X_9 - X_{F9} = x$ also $Y_1 - Y_{F1} + Y_2 - Y_{F2} + ...Y_9 - Y_{F9} = y$ B. now shift (ie update) $X_{F1}$ and $Y_{F1}$ as follows:
$X_{F1} + (x/9) =$ new value of $X_{F1}$
and $Y_{F1} + (y/9) =$ new value of $Y_{F1}$ C. now shift $X_{F2}$ and $Y_{F2}$, $X_{F3}$ and $Y_{F3}$, ...$X_{F9}$ and $Y_{F9}$ in exactly the same way as $X_{F1}$ and $Y_{F1}$ (see step B above)

After optimizer 40 has finished these steps, variance evaluator 43 is brought into play, first to compute the new value V of the new variance represented by the now-existing state of the coordinate transformation (see legends in evaluator 43 FIG. 5B) and then to settle the question whether $\Delta V$ is definitely positive, ie is greater than 0 (or whether on the contrary it is equal to or less than 0). $\Delta V$ is the new variance V minus an old stored value $V_{st}$ retained from the last previous evaluation in this same pattern-matching operation; thus a positive value represents an undesirable change, away from the variance minimum. After the question about $\Delta V$ has been settled and stored, evaluator 43 updates $V_{st}$. Then finally control unit 46 (or unit 47 if the cycle in progress is a rotation-optimizing cycle) is activated to decide what must be done next (in view of the state of ΔV which has been found). This sequential action of units 42, 43, and 46 (or 47) constitutes the process of checking the variance which is probably performed some 20 to 200 times for each full pattern match.

The principal elements for controlling the various cycles and subcycles of operation above outlined are:

A. Nine "markers" (represented by the larger circles) any one of which when "set", resets all the others and then controls the above described subcycle of variance checking (except PM the "pattern matched" marker which merely triggers $H_{49}$-finder 32);

B. Four flags (one bit storage elements or flipflops represened by the smaller circles and set and reset as indicated by the truth tables of FIGS. 6 and 7 and legends of FIGS. 5 and 5A;

C. Two cycle control units 46 and 47 whose decisions as functions of the states of the markers, flags, and of counter 45, are tabulated in the truth tables of FIGS. 6 and 7;

D. One fit counter 45 which counts "best fits" found by the size-optimizing search operations of scale changer 40 (ie it counts how many times the scale-change cycle-control 46 signals completion of a major size-matching cycle by initiating the rotation cycle—specifically by setting the 4L marker.

Of the nine markers, four (4EN, 1EN, 1SR, and 4SR) serve to control the minor subcycles of scale changer 40 to cause coarse (4 step) or vernier (1 step) subcycles in the EN (enlarge) or SH (shrink) directions. Four more (4R, 1R, 1L, and 4L) similarly control the subcycles of rotator 41 for coarse or vernier cycles in the R (clockwise) or L (counter-clockwise) directions. The way this control works can be best explained by a few examples. If, for instance, marker 4L is set, it conditions the rotator 41 for left rotation (ie the mathematical steps outlined in the legends of 41 in FIG. 5B are now understood to be performed per the uppermost signs of the ± and ∓ symbols) and it triggers this rotator 4 times before proceeding to the next three sequential steps: the activation of optimizer 42, then of evaluator 43, and finally of cycle control 47 (to decide what must happen next per the truth table of FIG. 6). If instead of marker 4L marker 1R had been set, rotator 41 would be conditioned to operate per the lower signs and would be triggered just once before the marker proceeded with translation optimization, then variance evaluation and finally another decision from control 47. Or if it had been 4R the rotation would again be to the right (lower signs effective) but there would be four rotation steps before shifting to units 42, 43, and then 47. The four markers 4EN, 1EN, 1SH, and 4SH similarly determine the direction of the scale changing steps and the number of such steps before making the variance check and the decision for further action based on such check (per control unit 46 and the truth table of FIG. 7 in this case).

The >< cycle control 46 (for decisions during a size-optimizing search by scale changer 40) and the θ cycle control 47 (used during a rotation-optimizing search) are fully described by the truth tables of FIGS. 6 and 7. But a brief outline of their design principles will make these easier to follow.

Every one of the alternating optimizing cycles (whether scale-changing or rotational) starts with a coarse subcycle; and if this first subcycle is in the "uphill", variance-increasing direction the stepping is reversed "specially" —ie without shifting down to vernier mode. Thus every cycle contains at least one coarse step which is "downhill". (If such a "special" reversal without downshift occurs, the first coarse step must have been uphill, thus the first reverse step will be downhill; if no such special reversal occurs the first coarse step must have been downhill). One exceptional case is the very first cycle of a newly-starting pattern-matching operation. Such very first cycle always begins with a vernier "dummy sub-cycle" (controlled by marker 1EN) whose real purpose is to execute a variance check thus storing a reasonable $V_{STORED}$ value in evaluator 43. The single upward step in size is unimportant. In the exceptional state existing near the end of this dummy subcycle (1EN set, but start flag not set) the question of whether ΔV is 0 or not is also unimportant—see the asterisks and foot note in FIG. 7. After this vernier "dummy subcycle" the first regular subcycle will be a coarse subcycle and, as always, at least one downhill coarse subcycle will be achieved.

Since the fit cannot continue to improve forever in any practical situation, every cycle ultimately executes an uphill coarse subcycle and this causes a normal reversal (with simultaneous downshift to vernier mode). Within a few vernier subcycles the variance minimum will again be passed and thus every cycle executes one uphill vernier subcycle. When this occurs the end flag is set and a marker is set which will control one last vernier step back toward the mainimum (or somewhat past it) so that every cycle ends less than half a step away from the variance minimum. Normally such ending of any optimizing cycle is accomplished by control 46 (or47) merely by resetting all flags and markers and simultaneously, or subsequently, setting a marker-(4EN or 4L) which is appropriate for starting the alternate type of cycle.

After fit-counter 45 (which counts only those "best fits" achieved by scale-changer 40 ) has reached a desired number—the truth table of FIG. 6 shows this as 2— one last rotation-optimizing cycle is performed as usual and when this is completed the marker "PM" (pattern matched) is set. As indicated in FIG. 5, the set state of marker PM triggers the $H_{49}$ finder 32 to wind up the whole best-fit heading calculation. To do so this finder 32 not only derives the latest heading $H_{49}$ (by the steps listed in the legend of block 32, FIG. 5) and updates the stored headings, but it also resets all flags, markers, counters, $V_{st}$ in evaluator 43 and finally resets itself( after the $H_{49}$ value has been found, has been sent to the position predictor 20 of FIG. 1, and has been used to update the aircraft's own $A_{c-1}$ and $B_{c-2}$ storage in memory block 33).

It is recognized that the pattern matcher of FIG. 5 is much more complex and more demanding of computation power than the matcher of FIG. 3. For matching under conditions of equispaced fixes and reports and constant ground speed the value of its actual determination of variance and other data may not justify this. But perhaps under conditions of skipped reports or fixes, intentional and substantial changes of airspeed by the pilot (with or without a report thereof and/or sufficient wind so that a 90° turn makes many knots change in ground speed the matcher of FIG. 5 may offer advantages.

Although the detailed disclosure of my preferred embodiments illustrated and described above consists mostly of complicated explanations of different means for and methods of processing a string of radar fix data and a string of turn-rate reports to derive a flight heading accurate enough and current enough so that the airplane's position can be predicted some tens of seconds into the future, I do not believe the essential feature of my invention lies in the particulars of any of these data processing means and methods. I believe the essential content of my invention lies in the realization that the noise-like jitter errors in secondary traffic control radar fixes make such fix data particularly deficient in its inherent information content with respect to current rates of changes and short-term position prediction and the discovery that turn-rate data is peculiarly suited to curing the special deficiencies of such radar fix data in respect to current, or very recent "flight-heading" (ie direction of travel) and short term position predictions.

Traffic-control secondary-radar fixes are very well suited for determining the positions of large numbers of cooperating aircraft with enough accuracy to monitor their adherence to (or departure from) prescribed corridors and flight patterns. But their fix errors have a jittering or noise-like character such that it is inherently impossible to extract current and accurate rate-type information from two, or several, or many such fixes. One can get fairly good position from one fix, or very good position from a string of fixes by a sophisticated running-fix techique, but with respect to rates of change of position the information content of the fixes is particularly low.

Jittering characteristics of secondary radars under multiinterrogation conditions temporarily falsify the potentially precise monopulse azimuth determinations so that rates of change of position perpendicular to the radar beam at full radar range cannot be derived with any useful accuracy by even the most sophisticated data processing from two or three sweeps. The information just isn't there in any form. By using a large number of fixes, rate-type information (speed or heading) can be obtained with reasonable accuracy, but it is then a mean or average rate not applicable to the present moment. The fix data inherently doesn't contain current rate information. The realization of this inherent lack of current rate information in the fixes, the gradual appreciation of the importance of extreme currency of rate type data for short range position predictions, and the almost accidental discovery of the tremendous improvement possible when turn rate data is provided (even if it is not used with full efficiency) is, I believe, the major contribution of the present invention.

By combining a string of radar fixes with a series of turn-rates reported with only a small filter delay D it becomes possible to obtain a flight heading whose $1\sigma$ uncertainty $U_H$ (in radians) closely approaches that of a mean flight heading optimally averaged over the whole string, but which still can be current within D seconds. If this heading is explicitly brought out and then used to predict position F seconds into the future the $1\sigma$ uncertainty in such position attributable to radar fix jitter can ideally be a little less than the sum of ($U_H \times$ the distance flown in F seconds) plus the error in feet of the starting position derived from a few last fixes in a running fix. Nevertheless this simple sum of two uncertainties is used in the appended claims as a yardstick against which to compare the actual, jitter-caused, one-sigma level of uncertainty in position-prediction for any system. The dynamic heading error due to the filtering delay D will be comparable with D times the aircraft's average turn rate during the D seconds just before the prediction was made.

Assume a ground speed of 150 knots, a fix interval $\tau$ of four seconds, a delay D of four seconds, a prediction interval F of 22 seconds, and a $1\sigma$ single-fix uncertainty of 600 feet. Then if a string of 9 fixes is used for prediction, $U_H$ is about 0.075 radian while the distance to be flown in 22 seconds is 5500 feet so that $U_H$ contributes a position uncertainty of 400 feet. The starting position if taken simply as the average of the last 3 fixes has an uncertainty of 350 feet. If when the prediction was made the aircraft was making a minor yaw correction at the rate of 10 milliradians per second, the dynamic heading error due to delay D would be only 0.04 radian which would contribute 200 feet error at the predicted point. But if itwas in a standard turn of ($\pi/60$) radian per second the dynamic error would 0.22 radian which would contribute 1210 feet. Any data processing methods which reasonably effectively used the combined information content of the fixes and turn rates would give results "closely comparable" to these (ie. different by not more than a factor of 1.2 up or down) and even a system using only about half the information would show "comparable" results (ie within a factor of 1.4 up or down).

I claim:

1. In an air-traffic-control system which (1) comprises an aircraft with a secondary radar beacon, having (1a) means for giving secondary radar returns in response to interrogations, and (1b) auxiliary measuring means for measuring a heading-related air-derivable quantity, and (1c) reporter means for emitting a stream of reports representing a succession of such measurements, and which (2) comprises a ground-based control equipment, having (2a) a secondary radar for periodically interrogating said beacon and receiving its returns, and (2b) tracking means for deriving from said returns a succession of noisy fixes on said aircraft, and (2c) report-handling means for receiving said reports and deriving therefrom a stream of heading-related auxiliary values, and (2d) predicting means to compute for said aircraft a position extrapolated (on the basis of said fixes and said auxiliary values and other information) to a future time, the improvement defined by the following characteristics:

I. that said auxiliary measuring means comprise a modest-cost heading-variation sensor capable of usefully sensing only shorter-term variations of the aircraft's heading rather than its absolute heading, II. that said reporting means consist of means for emitting (as said stream of reports) reports derived solely from said sensor, III. that due to the source from which they are derived (recited just above) said stream of reports has substantial information content re variations of heading but negligible information content re absolute flight-heading IV. that said control equipment also has IVA. means for storing a first string of data representing an extensive but limited sequence of said fixes spanning a specific time interval, and IVB. means for storing a second string of data representing an extensive but limited sequence of said auxiliary values covering approximately the same time interval, V. that said predicting means comprise means for applying to said computation all the more significant ones of said stored first string of data and all the more significant ones of said second string of data.

2. In a system according to claim 1 the improvement according to claim 1 further limited by the requirement that "the more significant ones of said stored first string" shall in every case include at least the data representing the first and last fixes of said limited sequence of fixes and the data representing a few last ones of said fixes, and by the further requirement that "the more significant data of said stored second string" shall in every case include at least the data necessary to represent the overall heading change during said time interval.

3. In an air-traffic-control system which (1) comprises an aircraft with a secondary radar beacon, having (1a) means for giving secondary radar returns in response to interrogations, and (1b) auxiliary measuring means for measuring a heading-related air-derivable quantity, and (1c) reporter means for emitting a stream of reports representing a succession of such measurements, and which (2) comprises a ground-based control equipment, having (2a) a secondary radar for periodically interrogating said beacon and receiving its returns, and (2b) tracking means for deriving from said returns a succession of noisy fixes on said aircraft, and (2c) report-handling means for receiving said reports and deriving therefrom a stream of heading-related auxiliary values, and (2d) predicting means to compute for said aircraft a position extrapolated (on the basis of said fixes and said auxiliary values and other information) to a future time, the improvement defined by the following characteristics:

I. that said auxiliary measuring means comprise a modest-cost heading-variation sensor capable of usefully sensing only shorter-term variations of the aircraft's heading rather than its absolute heading, II. that said reporter means consist of means for emitting (as said stream of reports) reports derived solely from said sensor in an effectively filtered form with an effective delay of D seconds, III. that due to the source from which they are derived (recited just above) said stream of reports has substantial information content re variations of heading but negligible information content re absolute flight-heading IV. that said control equipment also has IVA. means for storing a first string of data representing an extensive but limited sequence of said fixes spanning a specific time interval, and IVB. means for storing a second string of data representing an extensive but limited sequence of said auxiliary means covering approximately the same time interval, V. that said predicting means comprise VA. computation means effectively applying to the estimation of latest flight-heading an "important" fraction of all the following available information content:

VAa. the information content re mean absolute flight-heading averaged over said time interval which is inherent in said first string of data, VAb. the information content re the angular relations between the headings existing at different instants within said specific time interval which is inherent in said second string of data VB. the criterion of importance of the effectively applied fraction being that the resulting estimated latest flight-heading pass the following two tests:

VBa. the fix-noise-attributable uncertainty in such estimated latest flight-heading shall be comparable with that of an ideal mean heading optimally derived from all the fixes represented by said first string of data.

VBb. the departure from perfect currency of such estimated latest flight-heading shall be closely comparable with D seconds VC. and also comprise means for predicting the aircraft's future position based on said estimated latest flight-heading, and on a present position derived from at least the last two of said sequence of fixes, and on other information.

4. In an air-traffic-control system with (1) comprises an aircraft with a secondary radar beacon, having (1a) means for giving secondary radar returns in response to interrogatons, and (1b) auxiliary measuring means for measuring a heading-related air-derivable quantity, and (1c) reporter means for emitting a stream of reports representing a succession of such measurements, and which (2) comprises a ground-based control equipment, having (2a) a secondary radar for periodically interrogating said beacon and receiving its returns, and (2b) tracking means for deriving from said returns a succession of noisy fixes on said aircraft, and (2c) report-handling means for receiving said reports and deriving therefrom a stream of heading-related auxiliary values, and (2d) predicting means to compute for said aircraft a position extrapolated (on the basis of said fixes and said auxiliary values and other information) to a future time F seconds after the latest of said fixes, The improvement defined by the following characteristics:

I. that said auxiliary measuring means comprise a modest-cost heading-variation sensor capable of usefully sensing only shorter-term variations of the aircraft's heading rather than its absolute heading, II. that said reporting means consist of means for emitting (as said stream of reports) reports derived solely from said sensor in an effectively filtered form with an effective delay of D seconds, III. that due to the source from which they are derived (reciated just above) said stream of reports has substantial information content re variations of heading but negligible information content re absolute flight-heading IV. that said control equipment also has IVA. means for storing a first string of data representing an extensive but limited sequence of said fixes spanning a specific time interval, and IVB. means for storing a second string of data representing an extensive but limited sequence of said auxiliary values covering approximately the same time interval, V. that said predicting means for computing a position extrapolated on the basis of said fixes and said auxiliary values) comprise VA. computation means effectively applying to the estimation of said extrapolated position an "important" fraction of all the following available information content:

VAa. the information content re absolute mean flight-heading (averaged over said time interval) which is inheret in said first string of stored data, VAb. the information content re angular relation between changing headings over said time interval which is inherent in said second string of stored data, VAc. the information content re recent aircraft position which is inherent in an average of at least the last three of said fixes, VB. the criterion of "importance" of the effectively applied fraction being that the resulting extrapolated position shall pass the following two tests (VBa and VBb):

VBa. that the fix-noise-attributable uncertainty of the extrapolated position shall be comparable with the sum of VBa1. the uncertainty (in radians) of an ideal mean heading (optimally derived from all the fixes of said sequence) multiplied by the distance flown by the aircraft in F seconds plus VBa2. the position uncertainty of an average of three fixes VBb. that in the absence of such fix noise the error in the extrapolated position due to the aircraft's recent turn rate shall be closely comparable to that which would result from a final flight-heading error of the following value VBb1. D times the aircraft's mean turn-rate averaged over the last D seconds.

* * * * *